(12) United States Patent
Mercer (10) Patent No.: US 9,309,652 B2
(45) Date of Patent: Apr. 12, 2016

(54) WATER COLLECTION CONTAINER AND LID

(71) Applicant: Kevin Gordon Mercer, Toronto (CA)

(72) Inventor: Kevin Gordon Mercer, Toronto (CA)

( * ) Notice: Subject to any disclaimer, the term of this patent is extended or adjusted under 35 U.S.C. 154(b) by 199 days.

(21) Appl. No.: 13/896,939

(22) Filed: May 17, 2013

(65) Prior Publication Data
US 2014/0338760 A1    Nov. 20, 2014

(51) Int. Cl.
| | |
|---|---|
| E04D 13/08 | (2006.01) |
| E03B 3/03 | (2006.01) |
| C01F 1/00 | (2006.01) |
| C02F 1/00 | (2006.01) |
| E03B 3/02 | (2006.01) |
| C02F 103/00 | (2006.01) |

(52) U.S. Cl.
CPC . *E03B 3/03* (2013.01); *C02F 1/001* (2013.01); *E03B 3/02* (2013.01); *C02F 2103/001* (2013.01); *E04D 2013/086* (2013.01); *E04D 2013/0813* (2013.01); *E04D 2013/0853* (2013.01); *Y10T 137/6969* (2015.04); *Y10T 137/6973* (2015.04); *Y10T 137/87796* (2015.04)

(58) Field of Classification Search
CPC .............. E03B 3/00; E03B 3/02; E03B 3/03; C02F 1/001; C02F 2013/001; E04D 2013/0813; E04D 2013/086; E04D 2013/0853; Y10T 137/6973; Y10T 137/6969
USPC .......... 137/1, 115, 356–358, 360, 395, 547, 137/561, 577, 590, 607, 625, 861, 862, 137/872–875, 887; 141/2, 18, 85–86, 115, 141/331–332, 340–341; 220/212; 251/205, 251/293, 315.01; 210/348; 52/11–12, 16; 239/193, 194, 208
See application file for complete search history.

(56) References Cited

U.S. PATENT DOCUMENTS

| | | |
|---|---|---|
| 4,386,484 A | 6/1983 | Van Berne et al. |
| 4,726,151 A | 2/1988 | Vitale |
| 5,730,179 A | 3/1998 | Taylor |
| 5,863,151 A | 1/1999 | Chapotelle |
| 6,526,699 B1 | 3/2003 | Foglio, Sr. |
| 6,941,702 B1 | 9/2005 | Abrams et al. |
| 6,966,333 B1 | 11/2005 | Kuehneman |
| 7,025,879 B1 | 4/2006 | Ticknor |
| 7,066,197 B1 | 6/2006 | Gray et al. |
| 7,395,633 B2 | 7/2008 | Baeta |

(Continued)

OTHER PUBLICATIONS

Coombes, P.J. et al. "Economic, Water Quantity and Quality Results from a House with a Rainwater Tank in the Inner City", 2002, Hydrology and Water Resources Symposium 2002, Melbourne, Australia (8 pages).

(Continued)

*Primary Examiner* — Atif Chaudry (57) ABSTRACT

A water collection container includes a tank; a lid having with an inlet opening in its top surface, and an overflow opening and a water inflow assembly on its underside. The water inflow assembly includes a valve interconnected between the inlet opening, the overflow opening and the tank and operated via a handle. The valve, in a first configuration, diverts water from the inlet opening to the tank and overflow from the tank to the overflow opening, and in a second configuration diverts water from the inlet opening to the overflow opening while substantially preventing water from entering the tank. An in-line filter may be located between the valve and inlet opening.

10 Claims, 8 Drawing Sheets

(56) References Cited

U.S. PATENT DOCUMENTS

| | | | |
|---|---|---|---|
| 7,493,728 B2 | 2/2009 | Dussault et al. | |
| 7,779,855 B2 | 8/2010 | McAvoy et al. | |
| 8,291,760 B2 | 10/2012 | Martheenal | |
| 2011/0290355 A1* | 12/2011 | Teoh .............................. | 137/575 |

OTHER PUBLICATIONS

Gardner, E.A., 2003, "Some examples of Water Recycling in Australian Urban Environments: A step towards Environmental Sustainability", 2003, Water Science and Technology: Water Supply, vol. 3, No. 4, pp. 21-31.

Farabakhsh, K. et al., "Developing Capacity for Large-Scale Rainwater Harvesting in Canada", 2009, Water Qual. Res. J. Can., vol. 44, No. 1, pp. 92-102.

Hager, M.C., "Low-Impact Development Lot-level approaches to stormwater management are gaining ground", 2003, The Journal for Surface Water Quality Professionals (11 pages).

Hasse, R., "Rainwater Reservoirs above Ground Structures for Roof Catchment", 1989, Deutsches Zentrum fuer Entwicklungstechnologien—GATE, Deutsche Gesellschaft fuer Technische Zusammenarbeit (GTZ) GmbH (89 pages).

Jeffrey, P. et al., "Water recycling: how feasible is it?", 2001, Filtration & Separation, vol. 38, Issue 4, pp. 26-29.

Jones, M.P. et al., "Performance of Rainwater Harvesting Systems in the Southeast United States", 2010, Resources, Conservation and Recycling, vol. 54, pp. 623-629.

Waterfall, P.H., "Harvesting rainwater for landscape use", 2006, University of Arizona, Cooperative Extension/Low 4 Program, Second Edition (60 pages).

Author Unknown, "Important Factors in Rain Water Harvesting", 2012, Water Law Resource, Lorman Business Center, Inc., pp. 1-5.

Lehner, P.H. et al., "Chapter 12: Low Impact Development" in Stormwater strategies: Community Responses to Runoff Pollution, 2001, Natural Resources Defense Council (27 pages).

* cited by examiner

WATER COLLECTION CONTAINER AND LID

FIELD OF THE INVENTION

The present invention relates generally to rainwater collection, and more particularly to a rainwater collection container and lid.

BACKGROUND

Rainwater runoff represents one of the largest insurance risk liabilities for individuals, companies, and governments in urban and suburban regions housing almost 80% of the global population. Further, polluted surface runoff is the single largest threat to ecosystem and drinking water security in many parts of the world, being as it is the largest individual source of oil/grease, heavy metals, organic and inorganic pollutants to surface and ground-waters. In many regions, one common solution to preventing runoff or flooding from excess rainwater, and its associated ecosystem and infrastructure damage, is to collect the rainwater, using a pail, barrel or other cistern, before it enters sewers as stormwater or results in surface flooding.

Such rainwater collection, however, is fraught with difficulties. For example, collection containers are often unsuitable in size or operational requirements necessary to prevent runoff or flooding. Moreover, collected rainwater may serve as a breeding ground for disease vector bearing mosquitoes. Additionally, maintenance of the rainwater containers depends on ownership and, due to sporadic maintenance, generally results in unreliable and possibly unsafe conditions.

Accordingly, there remains a need for improved water collection containers and components.

SUMMARY

Exemplary of embodiments, a water collection container includes a tank; a lid having with an inlet opening in its top surface, and an overflow opening and a water inflow assembly on its underside. The water inflow assembly includes a valve interconnected between the inlet opening, the overflow opening and the tank. The valve, in a first configuration, diverts water from the inlet opening to the tank and overflow from the tank to the overflow opening, and in a second configuration diverts water from the inlet opening to the overflow opening while substantially preventing water from entering the tank. An in-line filter may be located between the valve and inlet opening.

Exemplary of embodiments, a lid for a water container, includes a lid having a top surface, a bottom surface, an inlet opening in the top surface, and an overflow opening. The lid further comprises a water inflow assembly on an underside of the lid. The water inflow assembly comprises a three port valve. The three port valve is interconnected between the inlet opening, the overflow opening and a tank opening. The valve, in a first configuration, diverts water from the inlet opening to the tank opening, the overflow from the tank opening to the overflow opening, and in a second configuration diverts water from the inlet opening to the overflow opening while substantially preventing water from entering the tank opening.

Conveniently, the inflow assembly ensures that water in the tank and overflow are filtered. Further, the lid including overflow assembly allows the tank to be substantially sealed, to prevent insects, dirt and the like from collecting in collected water. As well, to store collected water the lid may be replaced with a conventional lid.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
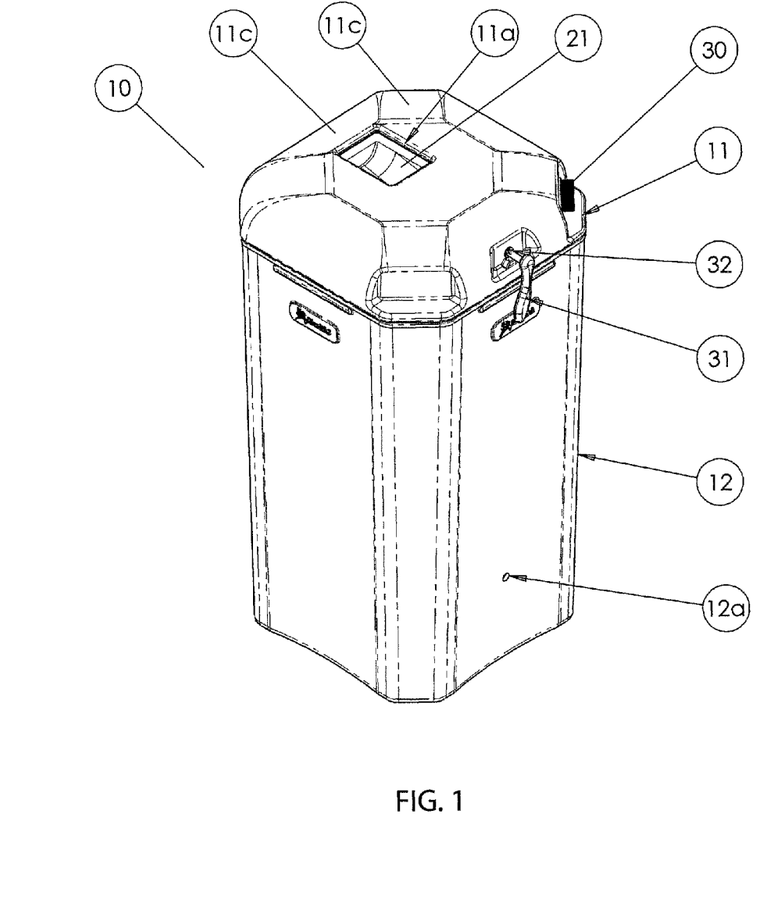
FIG. 1 is a perspective view of a water container, exemplary of an embodiment of the present invention.
Figure 4:
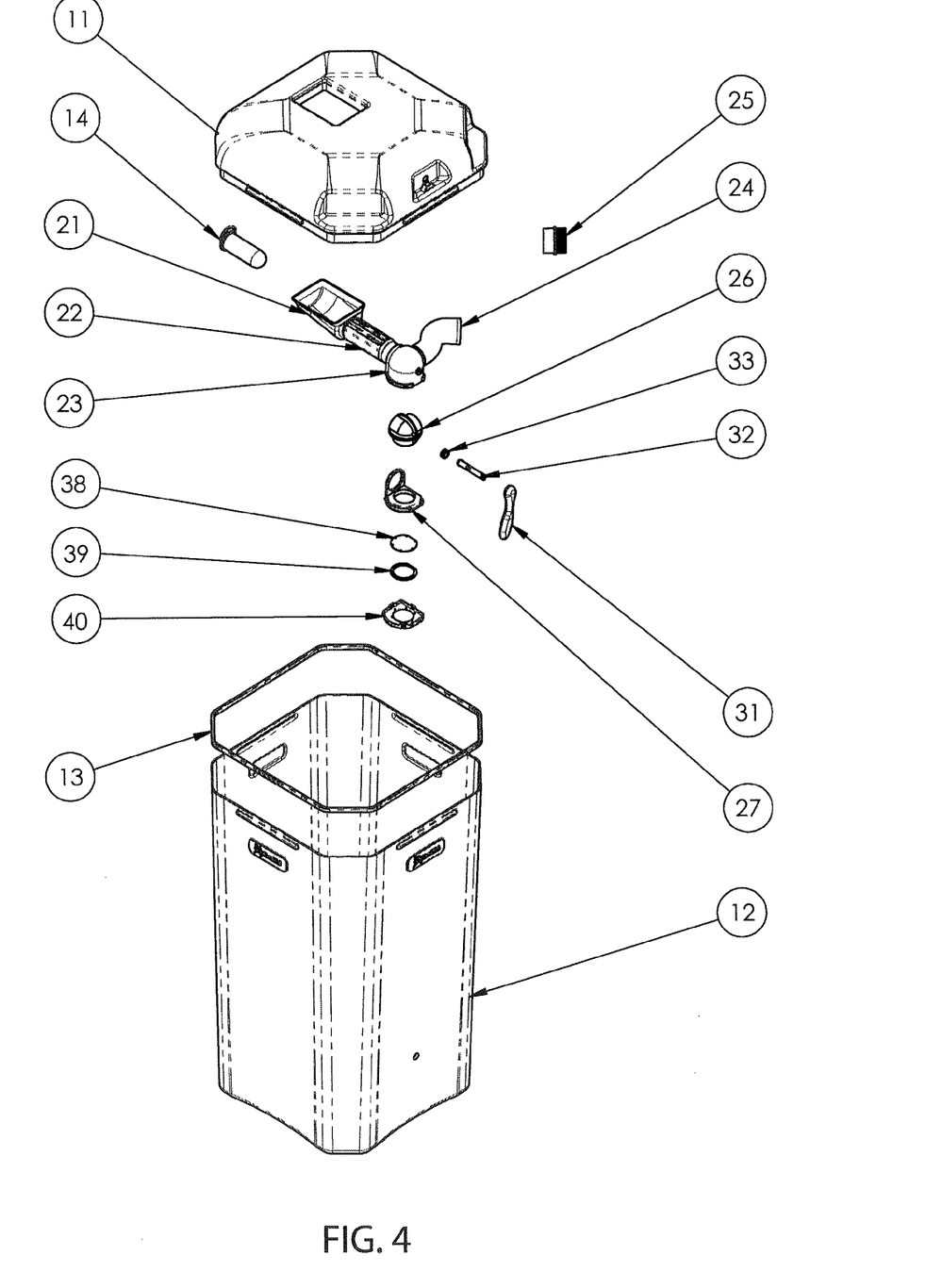
FIG. 4 is an exploded view of the water container of FIG. 1.

FIGS. 1 and 4 illustrate a water container 10 exemplary of an embodiment of the present invention. As will become apparent, water container is particularly well suited for collection and storage of rain water.

As illustrated, water container 10 includes a lid 11 and a tank 12. In the depicted embodiment, tank 12 takes the form of an eight sided pail, barrel or other concave structure having its top open. Of course, other shapes of tank 12 and its top opening are possible. Tank 12 may for example, take the form of a conventional refuse pail. Tank 12 may be formed of any suitable material—a polymeric material—such as plastic, rubber, metal or even clay or other heavier materials. Optionally, tank 12 may be lined, for example with plastic or the like, to keep collected water from contacting the material used to form the outer body of tank 12. Tank 12 may further include an outlet 12a, located near the bottom of tank 12. Outlet 12a may be equipped with a valve (not shown), in the form of a tap or other valve that may be opened or closed to release collected water within tank 12. Outlet 12a may be connected to a hose or pipe (not shown) to guide water from tank 12.

Figure 2:
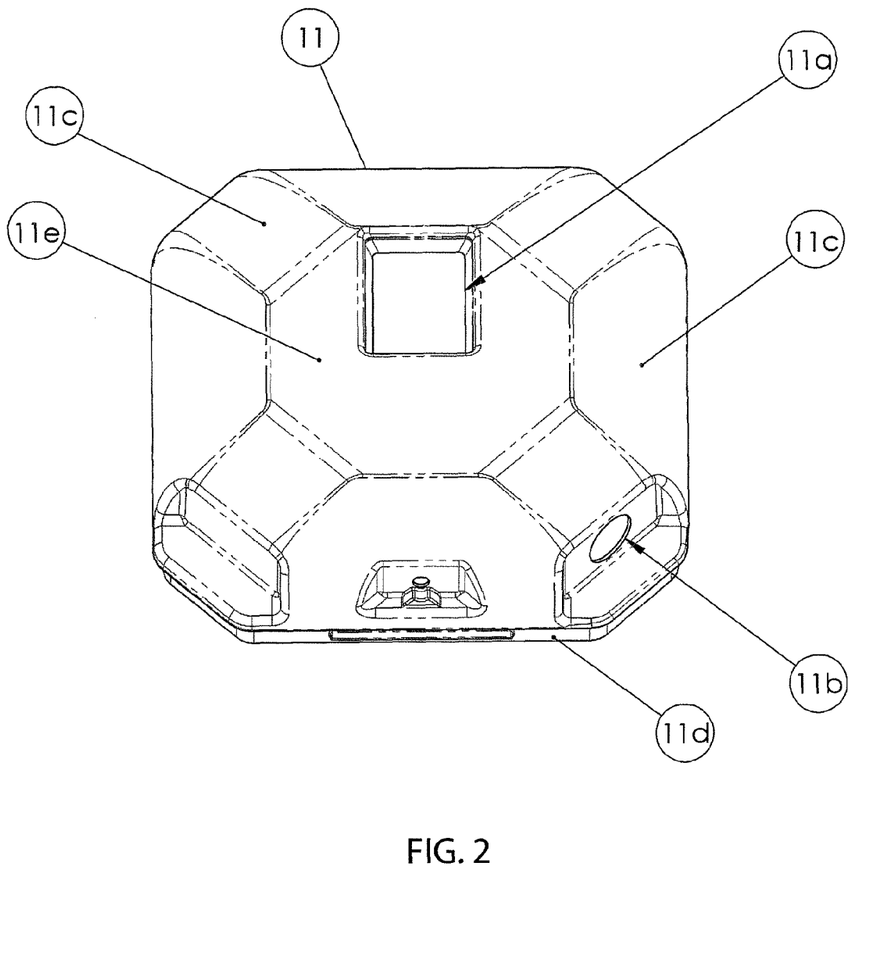
FIG. 2 is a perspective view of a lid of the water container of FIG. 1.
Figure 3:
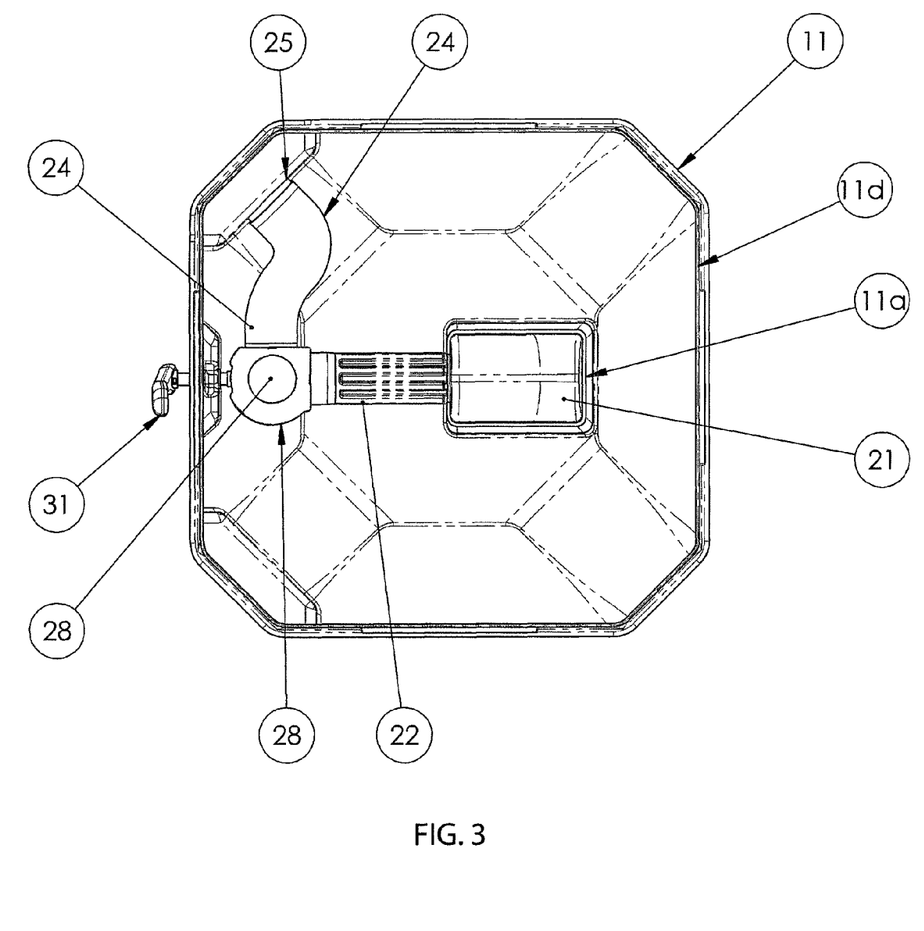
FIG. 3 is a bottom plan view of the lid of FIG. 2.

Lid 11, more particularly illustrated in FIGS. 2 and 3, is shaped complementary to the top opening of tank 12, to substantially cover the top as illustrated in FIG. 1. As such, exemplary lid 11 has eight sides. As well, in the depicted embodiment, lid 11 has a generally flat top 11e, with eight downwardly sloping panels 11c extending therefrom to define a dome, having a top and bottom surface. A skirt 11d also extends along the periphery of lid 11.

A gasket 13 may extend around the periphery of the top edge of tank 12, and be located in a vertical groove that extends around the periphery of the top edge of tank 12 and receives skirt 11d of lid 11. Gasket 13 may extend along the entire height of skirt 11d, or only along a portion of this height.

Lid 11 has mounted on its underside, a plumbing to direct water into tank 12—the plumbing is hereinafter referred to as water inflow assembly 20, best seen in FIGS. 3, 4 and 5. Water inflow assembly 20 is mounted to the underside of lid 11 and routes liquid—typically rain water—to be collected into tank 12 through lid 11. In particular, the top of lid 11 includes an inlet opening 11a and one of panels 11c includes an overflow opening 11b. Water inflow assembly 20 extends from inlet opening 11a to overflow opening 11b and further diverts water collected through inlet opening 11a into tank 12.

Figure 5:
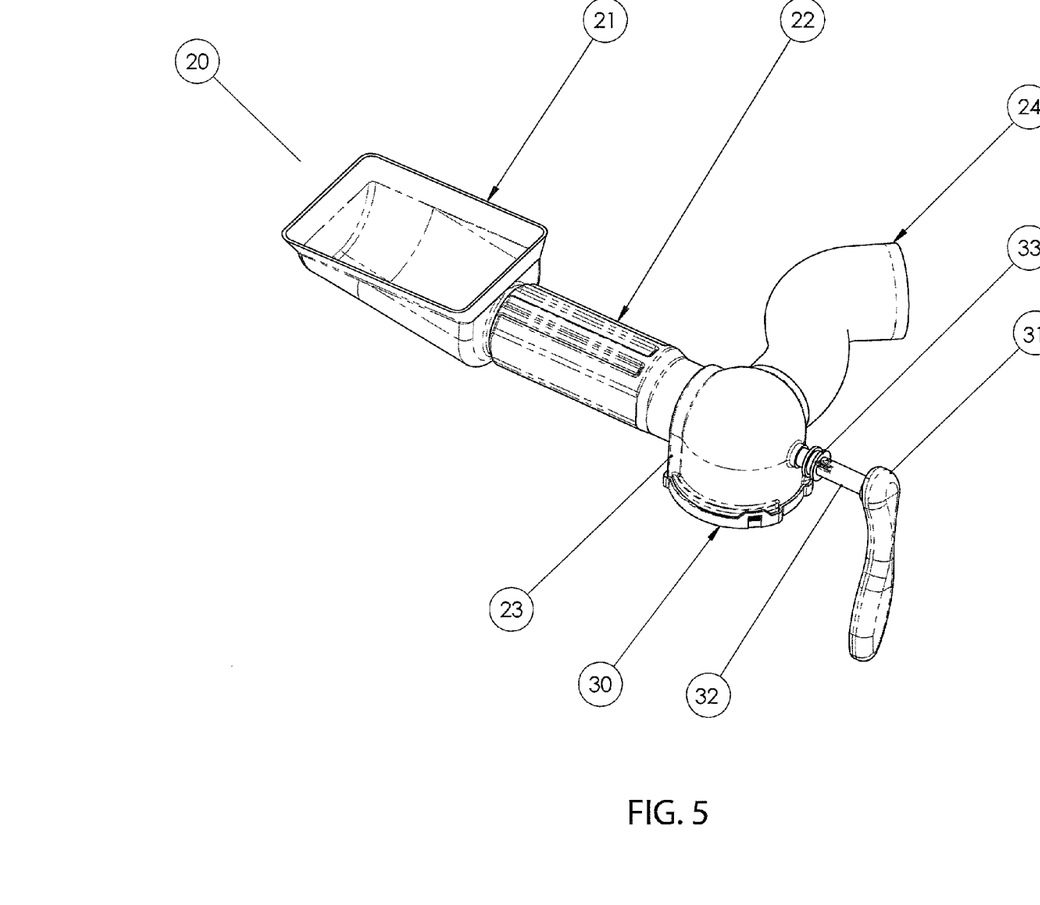
FIG. 5 is a perspective view of a water inflow assembly of the water container of FIG. 1.

Water inflow assembly 20 is more specifically depicted in FIGS. 3 and 5. As illustrated, water inflow assembly 20 includes trough 21, an in-line filter 14, (inside pipe 22), a valve 28 in the form of a three-port valve, and overflow opening pipe portion 24. Water inflow assembly 20 is on the underside of lid 11, and may be mounted or formed at a slight downward angle—with trough 21 at a higher position than overflow opening 11b (FIG. 2), providing a gravity assisted flow path between inlet opening 11a, valve 28 and overflow opening 11b.

Figure 6:
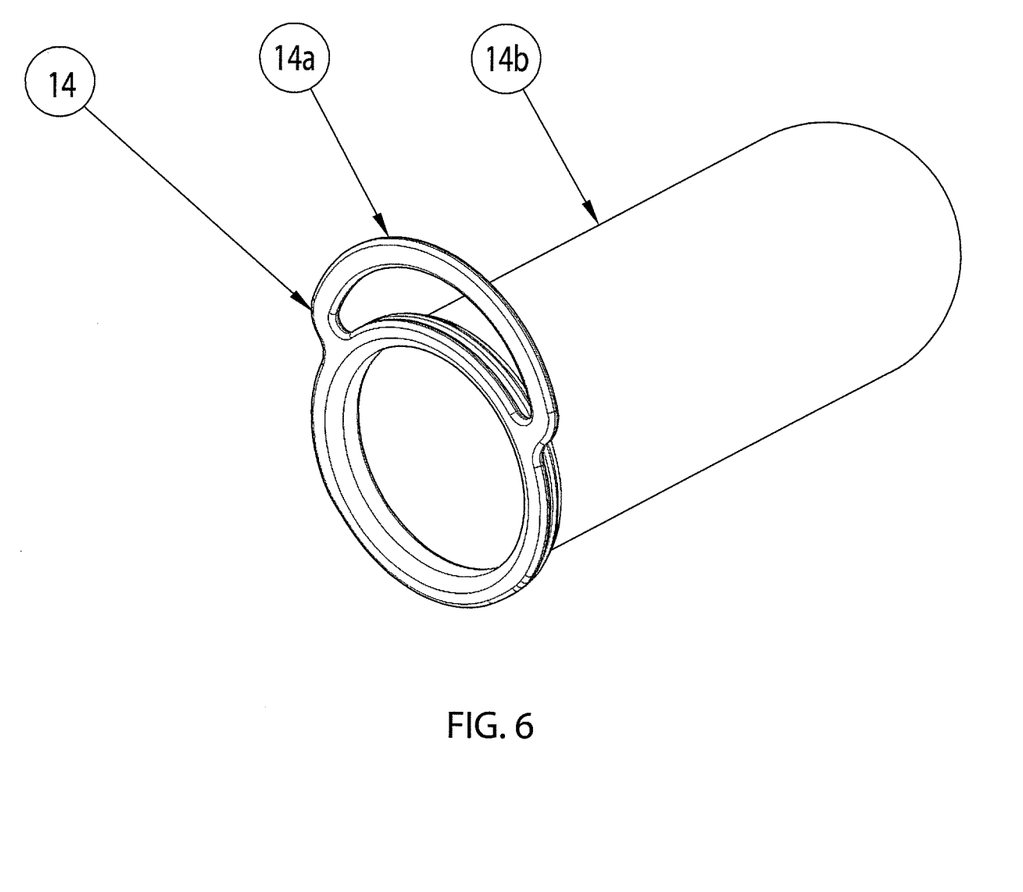
FIG. 6 is an enlarged view of a filter used in the water inflow assembly of FIG. 5.

Filter 14 is further depicted in FIG. 6. As illustrated, filter 14 includes a mesh filter 14b made into a sock like shape with a plastic holder 14a attached to it. Mesh filter 14b and holder 14a may be removably installed in pipe 22. Mesh 14b and holder 14a may be removed from pipe 22, cleaned and/or replaced with ease. Mesh filter 14b may, for example, extend lengthwise within, and throughout, outer pipe 22 and be fibrous to provide a number of porous paths between the inlet and the outlet of the pipe 22. Porous paths may, for example, be randomly arranged in three dimensions in the pipe and be as small as several hundred nanometers. Mesh filter 14b may be water repellent formed for example of a hydrophobic material such as nylon or another polymeric material. In a depicted embodiment, in-line mesh filter 14b may be formed using a nylon made available under the trademark NITEX™, by SEFAR AG., a size of about 200 nm, and typically 210 nm. Mesh filter 14b is about 25%-45% porous (typically 33% porous)—in other words 25%-55% (typically 67%) of the mesh is comprised of the circa 200 mm plastic fibers that make the mesh filter 14b. Mesh filter 14b may further be removed from water inflow assembly 20, as required. As required, mesh filter 14b may be snap fitted to pipe 22.

Figure 7A:
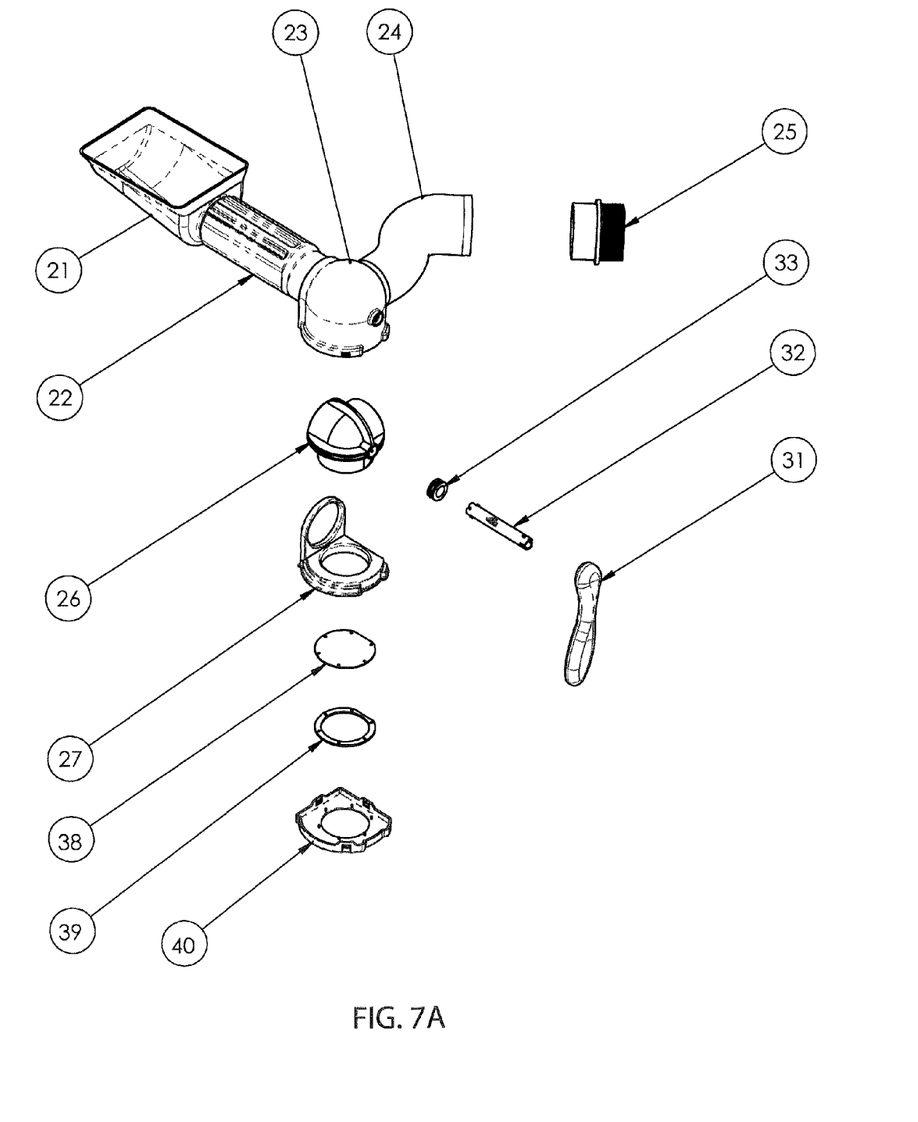
FIG. 7A is an enlarged component view of the water inflow assembly of FIG. 1.
Figure 7B:
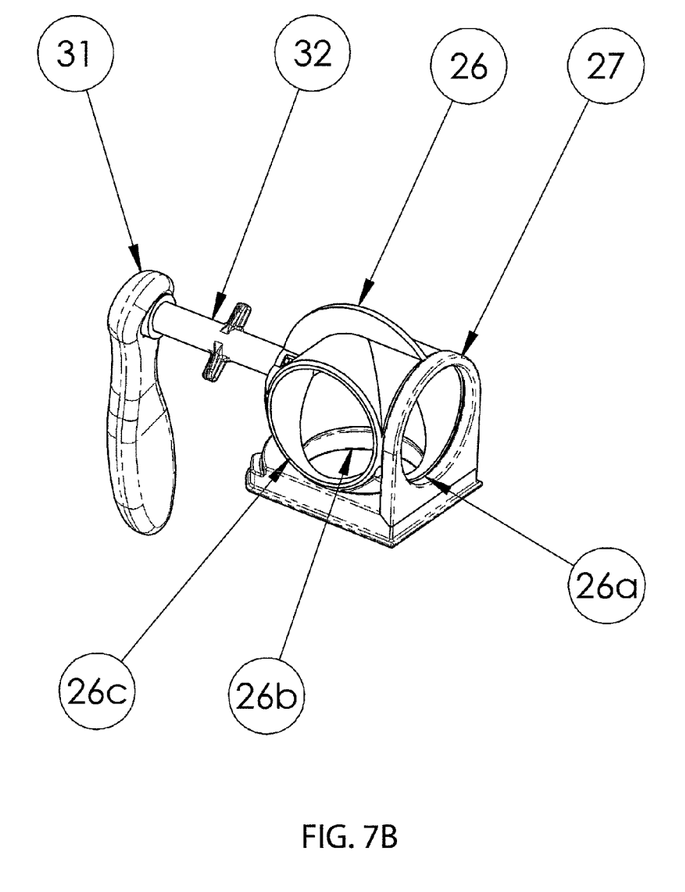
FIG. 7B is an enlarged view of a valve of the water container in FIG. 1.

FIG. 4 contain enlarged views of valve 28. A portion of valve 28 is shown in FIG. 7B. As illustrated, valve 28 includes an outer housing 23, having three valve openings 26a, 26b and 26c. A valve core 26 may be configured (e.g. turned) to control which of these three valve openings 26a, 26b and 26c may be closed at any time. As illustrated, valve openings 26a and 26c are in a generally vertical plane, while valve opening 26b is in a generally horizontal plane. A handle 32 may extend from ball core 26 to move it between configurations, and may extend through lid 11 (as illustrated in FIGS. 1-3). An internal filter 38 may cover any of openings 26b and 26c (in the depicted embodiment filter 28 covers valve opening 26b). Ball core 26 may be seated in frame 37, and retained in outer housing 23 by seal 39 and cover 40.

Pipe 24 is a conventional diversion pipe segment, formed, for example of ABS or other plastic. The shape of pipe 24 is somewhat arbitrary. Pipe 24 serves to guide water from valve 28 to overflow opening 11b, and may thus be slightly inclined downwardly. Pipe 24 may terminate in threaded end 25.

Now, as illustrated in FIGS. 3 and 4, valve opening 26a is interconnected with filter pipe 22 which contains filter 14. Filter 14, in turn, is fed by trough 21. Thus valve opening 26a is in flow communication with inlet 11a; valve opening 26c feeds overflow opening 11b; and opening 26b feeds tank 12. Valve 28 thus allows fluid to be diverted from valve opening 26a (and thus inlet opening 11a) to either or both valve openings 26b and 26c.

Trough 21 of water inflow assembly 20 is arranged beneath inlet opening 11a of lid 11 to collect intake water. As noted, valve handle 31 extends outwardly from lid 11. Conveniently, water inflow assembly 20 is contained within lid 11. Thus, as lid 11 is removed from tank 12, water inflow assembly 20 stays connected thereto. As such, lid 11 may be moved from tank to tank, to collect water as required.

In operation, lid 11 is placed atop tank 12 into which rain water is to be collected. Skirt 11d forms a relatively loose seal around the outer periphery of the top opening of tank 12, and inlet opening 11a faces upward. Seal 13 further seals lid 11 in place. Inlet opening 11a allows rain water to collect water in trough 21.

Collected water flows under the influence of gravity through in-line filter 14 to valve 28, into tank 12 and out of pipe 24.

Valve 28 may be configured by orienting handle 31, to allow captured rain water to flow into tank 12 or through overflow opening 11b.

In particular, in an open configuration, handle 31 is turned to orient valve core 26 to open all three of valve openings 26a, 26b and 26c of valve 28. In this configuration, collected rain water flows through inlet opening 11a into trough 21 and out of valve opening 26b into tank 12. Once tank 12 fills, water may overflow out of valve opening 26c, and from overflow opening 11b. Conveniently, valve 28 and overflow opening 11d are downstream of in-line filter 14. As such, only filtered water will overflow.

In a second configuration, handle 31 is turned to close valve opening 26b, while keeping both valve opening 26a and valve opening 26c open. Any water collected through inlet opening 11a and in trough 21 flows through in-line filter 14 and pipe 22, and out of overflow opening 11b, while no water flows into tank 12—effectively closing tank 12. Conveniently, water inflow assembly 20 is drained. This is particularly advantageous as no volume of water pools in trough 21 or elsewhere. As will be appreciated, pooled water tends to attract mosquitoes and other insects which is undesirable and may lead to disease and infestation.

Optionally, overflow opening 11b may be connected with piping (not shown) to divert overflow water to a convenient locale. For example, overflow opening 11b might be connected by way of polymer pipes or metal and polymer pipes (e.g. PEX pipes) to building weeping tile, or to other suitable drain locations, so that storm water does not outflow from the property. A hose for slow drain watering of plants may be a further alternative.

Optionally, a further lid (not shown) may be used to close and seal filtered, accumulated water within tank 12. This lid may be entirely conventional with no water diversion assembly. As well, lid 11 may be manufactured almost entirely of polymeric materials allowing it to be light, easily transported and easy to assembly. Optionally, the water inflow assembly 20 and the remainder of lid 11 may be integrally formed using, for example, injection moulding or otherwise.

As well, conveniently, all of the hardware to filter and divert water is contained in lid 11, thus allowing the lid to be transported from tank to tank. As will be appreciated, tank 12 may be entirely conventional, and relatively inexpensive to produce.

Of course, the above described embodiments are intended to be illustrative only and in no way limiting. For example, many other geometries are possible. Similarly, the plumbing (i.e. water inflow assembly 20) of lid 11 may take many different forms, configurations and/or geometries. The described embodiments are susceptible to many modifications of form, arrangement of parts, details and order of operation. The invention, rather, is intended to encompass all such modification within its scope, as defined by the claims.

What is claimed is:

1. A water collection container, comprising:
a tank;
a lid having a top and bottom surface, an inlet opening in said top surface and an overflow opening;
a water inflow assembly on an underside of said lid, said water inflow assembly comprising a valve, said valve interconnected between said inlet opening, said overflow opening and said tank, and an in-line filter wherein said valve, in a first configuration, diverts water from said inlet opening to said tank through said in-line filter and overflow from said tank to said overflow opening, and in a second configuration diverts water from said inlet opening to said overflow opening while substantially preventing water from entering said tank, wherein said in-line filter comprises a 210 nm or finer hydrophobic permeable mesh.

2. The water container of claim 1, wherein said in-line filter is exchangeable.

3. The water container of claim 1, wherein said water inflow assembly comprises a trough beneath said inlet opening.

4. The water container of claim 1, wherein said valve is positioned lower than said inlet opening.

5. The water container of claim 1, wherein said water inflow assembly is integrally formed with said lid.

6. The water container of claim 1, wherein said lid comprises a top panel, and at least one downwardly extending panel, and wherein said inlet is formed in said top panel and said overflow opening is formed in one of said at least one downwardly extending panel.

7. A lid for a water container, said lid having a top surface, a bottom surface, an inlet opening in said top surface, and an overflow opening; said lid further comprising a water inflow assembly on an underside of said lid, said water inflow assembly comprising a valve, and an in-line filter, said valve interconnected between said inlet opening, said overflow opening and a tank opening, wherein said valve, in a first configuration, diverts water from said inlet opening to said tank opening, and overflow from said tank opening to said overflow opening through said in-line filter, and in a second configuration diverts water from said inlet opening to said overflow opening while substantially preventing water from entering said tank opening, wherein said in-line filter comprises a 210 nm or finer hydrophobic permeable mesh.

8. The lid of claim 7, wherein said valve is positioned lower than said inlet opening.

9. The lid of claim 7, wherein said water inflow assembly is integrally formed with said lid.

10. The lid of claim 7, wherein said valve comprises a three-port valve.

* * * * *